US012705785B2

(12) United States Patent
Starr et al.

(10) Patent No.: US 12,705,785 B2
(45) Date of Patent: Aug. 11, 2026

(54) INDUSTRIAL FOOD PROCESSING USING COMPUTER VISION

(71) Applicant: PreScouter, Inc., Chicago, IL (US)

(72) Inventors: Justin Starr, Pittsburgh, PA (US); Ashish Basuray, Petaluma, CA (US); Christopher Quick, Warrensburg, MO (US); Kristin Quick, Warrensburg, MO (US); Mohamed El Brini, Anglet (FR); Menna El-Shaer, Mountainview, CA (US); Enslam Ahmed, Cairo (EG)

( * ) Notice: Subject to any disclaimer, the term of this patent is extended or adjusted under 35 U.S.C. 154(b) by 120 days.

(21) Appl. No.: 18/237,374

(22) Filed: Aug. 23, 2023

(65) Prior Publication Data

US 2025/0069254 A1 Feb. 27, 2025

(51) Int. Cl.

| | |
|---|---|
| ***G06T 7/73*** | (2017.01) |
| ***G06V 10/764*** | (2022.01) |
| ***G06V 20/68*** | (2022.01) |

(52) U.S. Cl.
CPC .............. *G06T 7/73* (2017.01); *G06V 10/764* (2022.01); *G06V 20/68* (2022.01); *G06T 2207/30128* (2013.01); *G06V 2201/06* (2022.01)

(58) Field of Classification Search
CPC ............ G06T 2207/30128; G06T 7/73; G06V 10/764; G06V 20/68; G06V 2201/06
See application file for complete search history.

(56) References Cited

U.S. PATENT DOCUMENTS

| | | | | |
|---|---|---|---|---|
| 10,785,456 | B1 * | 9/2020 | Schroeder | H04N 23/661 |
| 11,055,905 | B2 * | 7/2021 | Tagra | G06T 19/006 |
| 11,182,598 | B2 * | 11/2021 | Sriram | G06T 7/246 |
| 11,741,367 | B2 * | 8/2023 | Namiki | G06F 18/214 382/155 |
| 2019/0227537 | A1 * | 7/2019 | Cella | G05B 19/4185 |
| 2021/0201431 | A1 * | 7/2021 | Glaser | G06T 7/73 |
| 2021/0256449 | A1 * | 8/2021 | Sigurdsson | A22C 17/0093 |
| 2022/0058381 | A1 * | 2/2022 | Ionescu | G06V 10/25 |

FOREIGN PATENT DOCUMENTS

| | | | | |
|---|---|---|---|---|
| CN | 113396020 A | * | 9/2021 | B07C 5/3422 |
| CN | 116630425 A | * | 8/2023 | G06T 7/73 |
| EP | 4481274 A1 | * | 12/2024 | G06V 20/52 |
| GB | 2122072 A | * | 1/1984 | B26D 3/185 |
| TW | 201709110 A | * | 3/2017 | G06F 16/51 |

* cited by examiner

*Primary Examiner* — Stephen R Koziol
*Assistant Examiner* — Benedict E Lee

(57) ABSTRACT

Computer vision is applied to images of food objects, allowing tracking of sub-objects separated there-from during processing and relating back outcomes observed to original locations within the food object. A method includes: obtaining an image of an object having a pattern; thereafter identifying sub-objects; determining an object location of respective sub-objects relative to the object based on the pattern; and providing an indicator, for the respective sub-objects, associated with the food processing and based on the object location of the respective sub-objects. The indicator may be a highlighted location of the sub-object within a three-dimensional (3D) model, a tracked or predicted outcome or classification, or an adjustment to a food processing step or equipment configuration.

20 Claims, 6 Drawing Sheets

Unskewed, binarized, reduced to match resolution

| 0.427 | 0.613 | 0.691 | 0.746 | 0.577 | 0.536 |
|---|---|---|---|---|---|
| 0.345 | 0.549 | 0.667 | 0.660 | 0.605 | 0.523 |
| 0.413 | 0.585 | 0.550 | 0.633 | 0.650 | 0.636 |
| 0.435 | 0.512 | 0.679 | 0.662 | 0.604 | 0.546 |
| 0.392 | 0.480 | 0.590 | 0.564 | 0.576 | 0.565 |
| [illegible] | 0.443 | 0.481 | 0.552 | 0.538 | 0.515 |
| 0.396 | 0.422 | 0.343 | 0.549 | 0.469 | 0.434 |
| [illegible] | 0.327 | 0.286 | 0.430 | 0.326 | 0.358 |

INDUSTRIAL FOOD PROCESSING USING COMPUTER VISION

BACKGROUND

Industrial food processing is complex and often includes multiple interdependent steps. Tracking food objects throughout the process is sometimes necessary to optimize later steps, such as ensuring that proper adjustments are made to certain steps in the process. Conventionally, manual tracking mechanisms have been employed, which may be subject to error.

BRIEF SUMMARY

One problem that arises in food processing for cheese in an industrial setting is tracking logs of cheese separated from a larger cheese block. The cheese logs are provided to subsequent food processing steps such as slicing. The outcome of the slicing is dependent on a variety of factors, include moisture content, hardness, etc., where the factors are influenced by the cheese log's original position within the larger cheese block, for example because it influences curing of the cheese log. When a cheese log's location within the larger cheese block is known, a likely outcome of the subsequent food processing is known, and adjustments to food processing, such as slicing speed, may be employed, improving the overall process. However, keeping track of a cheese log's original location and tracking it through an outcome is often difficult and managed manually, leading to errors, and adding time and cost to the process. Further, no conventional process automates a tracking or prediction of a cheese log's performance in subsequent food processing steps dependent on its location in the larger block.

Accordingly, an embodiment applies computer vision to images of food objects such as cheese, allowing tracking of sub-objects separated there-from during processing and relating back outcomes observed to original locations within the food object. An embodiment includes obtaining an image of an object having a pattern, such as a cheese block; thereafter identifying sub-objects, such as locations or putative locations of cheese logs within the cheese block; determining an object location of respective sub-objects relative to the object based on the pattern, e.g., employing a computer vision process to identify the original location within the block of separated cheese logs; and providing an indicator, for the respective sub-objects, associated with the food processing and based on the object location of the respective sub-objects, e.g., a tracked or predicted slicing outcome for the cheese log. As may be appreciated, the indicator may be a highlighted location of the sub-object within a three-dimensional (3D) model of the object, e.g., cheese block location, slice location including depth, etc., a tracked or predicted outcome or classification, e.g., slicing outcome, or an adjustment to a food processing step or equipment configuration, such as adjustments to a slicer that will operate on the cheese logs.

In summary, an embodiment provides a method, comprising: obtaining one or more images of an object having a pattern; thereafter identifying sub-objects, each of the sub-objects representing a respective sub-object physically separated from the object during food processing; determining, using a set of one or more processors, an object location of respective sub-objects relative to the object based on the pattern; and providing, using the set of one or more processors, an indicator, for the respective sub-objects, associated with the food processing and based on the object location of the respective sub-objects.

Another embodiment provides a system, comprising: one or more cameras; a set of one or more processors; and a non-transitory storage medium comprising code executable by the set of one or more processors to: obtain, using the one or more cameras, one or more images of an object having a pattern; thereafter identify sub-objects, each of the sub-objects representing a respective sub-object physically separated from the object during food processing; determine an object location of respective sub-objects relative to the object based on the pattern; and provide an indicator, for the respective sub-objects, associated with the food processing and based on the object location of the respective sub-objects.

A further embodiment provides a computer program product, comprising: a non-transitory computer readable medium comprising code executable by a set of one or more processors to: obtain, using one or more cameras, one or more images of an object having a pattern; thereafter identify sub-objects, each of the sub-objects representing a respective sub-object physically separated from the object during food processing; determine an object location of respective sub-objects relative to the object based on the pattern; and provide an indicator, for the respective sub-objects, associated with the food processing and based on the object location of the respective sub-objects.

The foregoing is a summary and is not intended to be in any way limiting. For a better understanding of the example embodiments, reference can be made to the detailed description and the drawings. The scope of the invention is defined by the claims.

DETAILED DESCRIPTION

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment (s)" (or the like) means that a particular described feature or characteristic is included in that example. The described feature or characteristic may or may not be claimed. The described feature may or may not be relevant to other embodiments. For the purpose of this detailed description, each example might be separable from or combined with another example, i.e., one example is not necessarily relevant to other examples, but combinations of embodiments are expected in some cases consistent with the examples described throughout.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In some instances, well-known details are not shown or described to avoid obfuscation.

An embodiment may apply computer vision to assist in industrial food processing, for example completing tasks such as determining where cheese logs originated within a larger cheese block, identifying when slices of cheese are cut poorly from a cheese log, determining a cheese slice's depth within the cheese log or block, relating (tracking) outcome data to a position in the original cheese block, providing a prediction of an outcome of slicing for a cheese log or portion thereof, or some combination of the foregoing.

Figure 4A:
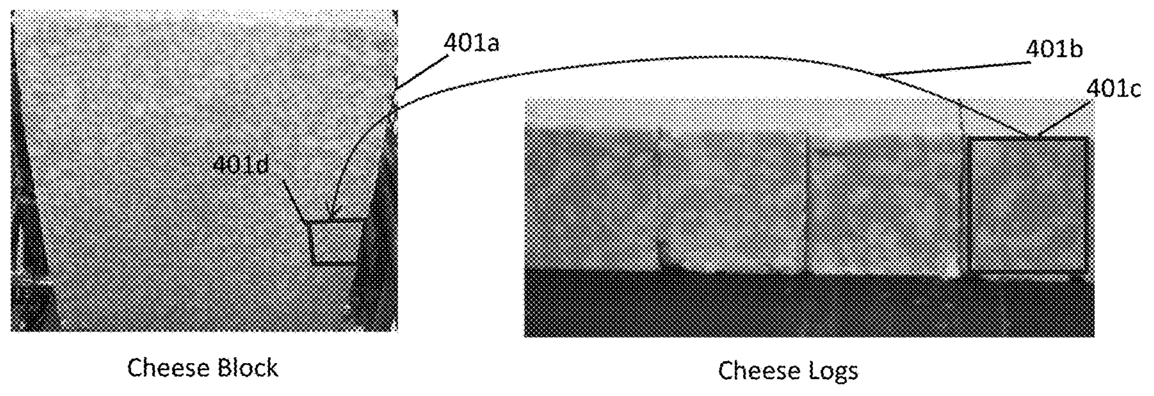
FIG. 4A through FIG. 4C illustrates examples of object and sub-object imaging and related processing outcomes according to an embodiment.
Figure 4B:
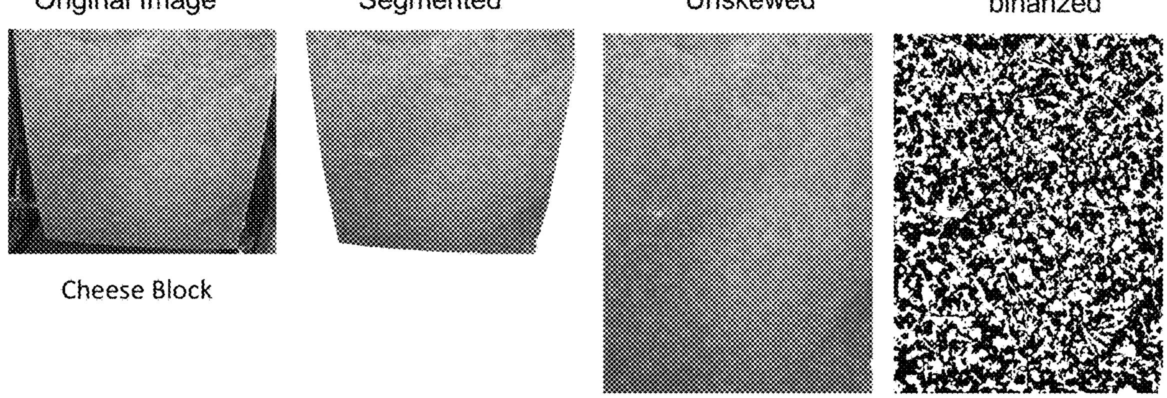
Figure 4C:
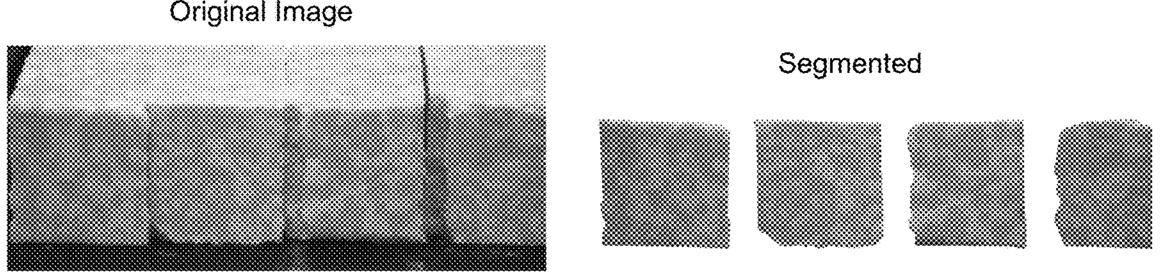
Figure 4C:

Referring to FIG. 1 and FIG. 4A-C, an embodiment provides a method that includes obtaining object image(s) at 101, for example obtaining front and back images of a cheese block, as illustrated in connection with FIG. 4A. The object image(s) may undergo processing prior to further analysis, for example being segmented, unskewed and binarized, as for example illustrated in FIG. 4B for a cheese block image and FIG. 4C for cheese log images, respectively.

Sub-objects such as cheese logs may be separated from the object, for example the larger cheese block, as indicated at 102. The separation of the sub-objects may be a physical separation, for example cutting cheese logs from a larger block, for example a 640-pound cheese block. Referring again to FIG. 4A, an example image of one side of a cheese block is illustrated in association with four cheese logs separated there-from.

As a cheese log's position within the larger block may influence its physical characteristics, such as moisture content, this information may impact food processing applied to it, e.g., slicing technique. Tracking a cheese log's position is thus useful as it moves throughout the process, for example moving down a conveyor belt to a slicer in association with food processing. To do so in an automated fashion, an embodiment obtains sub-object image(s) at 103, for example images of a front and back of a cheese log obtained from camera(s) positioned on or in association with food processing equipment, capturing images or videos as it moves down the conveyor belt to a slicer. Examples of sub-object images are provided in FIG. 4A and FIG. 4C. As with the object image(s), the sub-object image(s) may undergo processing prior to further analysis, for example being segmented, unskewed, and binarized, as for example illustrated in FIG. 4C for cheese log images.

An embodiment may utilize image features to determine an object location for the sub-objects as indicated at 104. For example, image recognition methods may be employed to match a pattern in an image 401*a* of the object's surface, e.g., as indicated at 401*d* of FIG. 4A, with a pattern of the sub-object, e.g., 401*c*. In the case of cheese, certain patterns such as color variation such as orange and white speckles in a surface image of the cheese block may be utilized to relate (401*b*) a surface pattern of a cheese log 401*c* with its location 401*d* within the larger cheese block image.

With respect to determining an object location at 104, a variety of models may be utilized. Referring to FIG. 2, a model may be formed as indicated at 220 to operate on image(s) including object and sub-object images obtained at 210. The model formed at 220 may operate on images to identify matching objects, validated at 230 for a performance metric. By way of example, to determine an object location at 104 of FIG. 1, a model may be formed to use a template matching process for pattern matching. For example, sliding a template formed from a sub-object image or region thereof, e.g., region 401*d* of FIG. 4A, over an object image, e.g., 401*a*, is employed to find a region in the object image, e.g., 401*d*, that matches best sub-object image or part thereof, e.g., segmented binarized image of a cheese log, illustrated in FIG. 4C. A template matching process may look for a maximum cross-correlation between each pixel or image region to determine a best matching location within the object image, e.g., on the basis of a pixel data value comparison process aggregated over the template. As may be appreciated, having knowledge of the object dimensions and separation processing applied, e.g., a grid where cheese logs are to be separated from the cheese block, may assist in comparing cheese log images to correct candidate regions in the block image.

As another example, a scale invariant feature transform (SIFT) model may be utilized. For example, a SIFT model may employ a process that identifies features between two images (object and sub-object) and identifies the matching features. For example, a cheese log image may be utilized to form a feature vector that is compared with feature vectors of regions of the cheese block image to identify a match.

As may be appreciated, other computer vision or image processing techniques may be utilized, which may depend on the type of object/sub-object under analysis or the prediction or classification to be made. Example techniques may include methods from statistics as well as those originating from computing science (often referred to collectively as machine learning), such that a trained model is formed at 220 and validated at 230 to operate on images to make the classification or prediction. For example, an embodiment that analyzes one or more object images may predict, e.g., for each predetermined or discovered sub-object location, an outcome for the sub-object related to food processing, such as slicing outcome. Such a model may be trained based on labeled image data collected for example via use of an embodiment that automates tracking of sub-objects, their respective original locations, and outcomes as described herein.

Figures 5A, 5B:
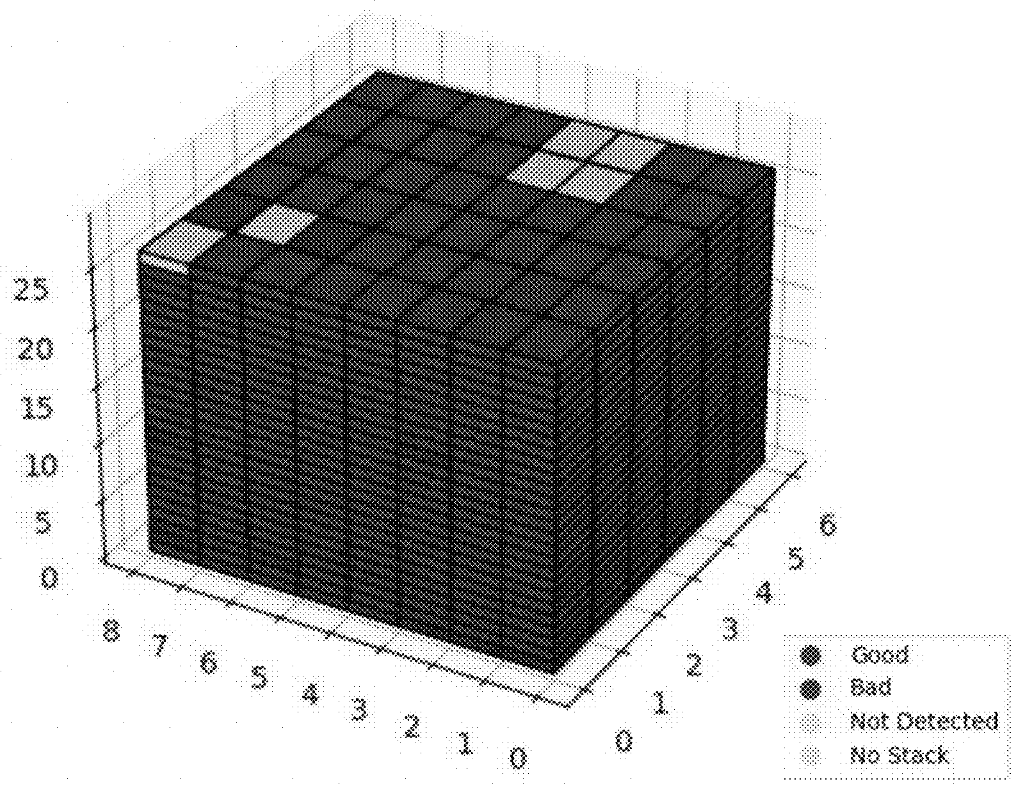
FIG. 5A through FIG. 5C illustrate examples of object or sub-object indicating according to an embodiment.
Figure 5C:

Referring to FIG. 5C, an embodiment may utilize a model trained to evaluate whether an outcome such as slicing was good or bad (or some set of categories of interest given the object/sub-objects in question). An outcome classification model may be used for reporting purposes and building a dataset for further training. As will be appreciated by those having ordinary skill in the art, a model such as a neural network that first detects an object (such as a slice stack) and then classifies the object (such as good or bad) may be trained and validated using a labeled set of training data (in this case images of cheese slice stacks labeled good or bad). In one example, a machine learning model formed at 220 and validated at 230 for classification on unseen or new data, such as subsequent images of cheese slice stacks as illustrated in FIG. 5C, may comprise a you-only-look-once (YOLO) model trained to identify and classify stacked slices of cheese. As described herein, this data may be useful for forming labeled datasets to train other models, e.g., a predictive model that analyses a cheese block or log image to identify regions predicted to produce good or bad slices based on a cheese log or cheese slice location within the block, its surface image features, etc.

Figure 1:
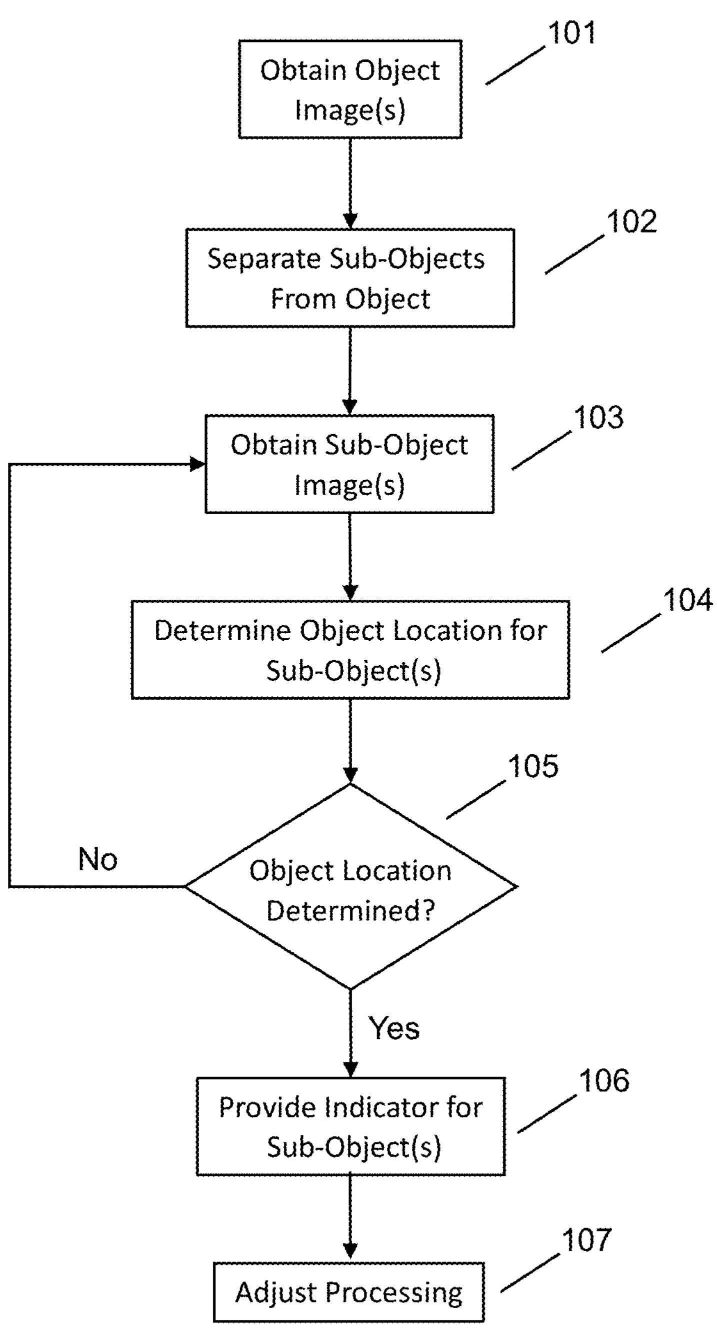
FIG. 1 through FIG. 3 illustrate example methods according to an embodiment.
Figure 2:
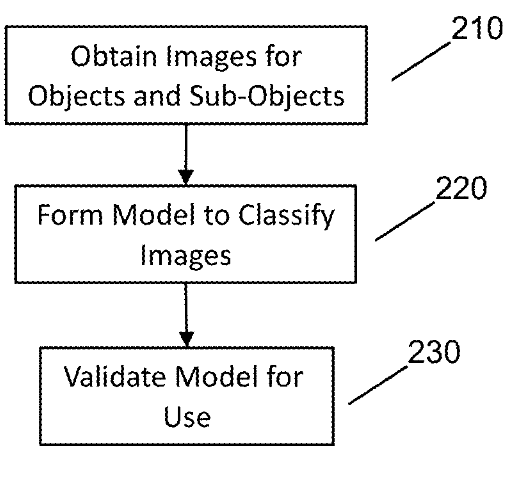

Referring to FIG. 1, having determined an object location for a sub-object at 104, the process may proceed to provide an indicator for the sub-object(s) as indicated at 106. As illustrated, if an object location for a given sub-object is not determined, as indicated at 105, the process may cycle back, e.g., to attempt template matching again, utilize a different model such as a SIFT model instead of template matching, etc., or the process may label the sub-object as not trackable, indicate an error code, or the like.

In an embodiment, the indicator, for the respective sub-objects, provided at 106 is associated with food processing and based on the object location of the respective sub-objects. By way of example, the indicator may be the location of the sub-object within the object in combination with a tracked or a predicted outcome of a food processing step for the sub-object, such as a tracked or predicted outcome of slicing for the respective sub-objects, e.g., cheese logs. This may be utilized in an embodiment that obtains one or more images of the sub-objects after they are physically separated from the object, e.g., imaging cheese logs after they are cut from the block, but prior to slicing. As such, the object location determined at 104 may be provided itself as the indicator at 106, for example to visually highlight for a human operator the origin location within the larger cheese block for a cheese log as it transits to a slicing operation.

As illustrated in FIG. 5A, an embodiment may provide one or more indicators to highlight (e.g., with color coding) or otherwise indicate (e.g., numeric matching confidence) the locations of tracked sub-objects with respect to their locations in the object. In the example of FIG. 5A, each cheese log sub-object is associated with a matrix location referenced to the original cheese block. As may be appreciated, data such as a predicted or tracked outcome, for example a slicing outcome, may be included in the indicator, e.g., via visual highlighting, color coding, providing alphanumeric data, etc. As described, the indicator may include a confidence indicator, such as a number or color indicator, providing information related to the confidence that the sub-object has been correctly identified and located within the model of the object.

Such indicators provided at 106 may allow automated, semi-automated, or manual adjustment to the processing step(s), as illustrated at 107. By way of example, a visual indicator of a next to be sliced cheese log's original position within the cheese block may be provided at 106 to a human operator to make an adjustment to the process, e.g., adjust configuration or timing of the slicer, as indicated at 107. As may be appreciated, the indicator may comprise data output to automate such an adjustment at 107, e.g., automatically tune a step in the food processing line, such as configuring a slicing machine differently for a given cheese log. A variety of indicators may be provided at 107, including indirect or summary indicators, e.g., an inner or outer peripheral original position is detected for the cheese log, an indication of slicing outcome for such a location, for similar location of the same block that has already been processed, etc.

Thus, depending on the type of sub-objects and the images available, an embodiment may provide indicators at 107 with different information. For example, in addition to providing an indication of a sub-object's location within an object in two dimensions, an embodiment may provide three-dimensional (3D) indicators, for example including depth information. To do so, an embodiment may utilize images of sub-objects that are related back to depth (z) as well as surface (x, y) location in the block (or other object geometry).

By way of specific example, referring to FIG. 5B, an indicator such as provided at 107 of FIG. 1 may include visually identifying or otherwise generating a 3D graphic of the object, for example a cheese block, with one or more of the respective object locations of the sub-objects, such as cheese slice stacks, within the object. The example of FIG. 5B illustrates that tracking a sub-object's depth or 3D location along with outcome classification allows for employing outcome reporting in 3D. Such historical tracking data may be used in a variety of ways, for example forming a labeled training dataset that may in turn be used to create a trained and validated model making predictions for each 3D slice location within the cheese block, e.g., based on surface imagery and/or other data (such as curing conditions, historical outcomes for a given cheese type, etc.).

Figure 3:
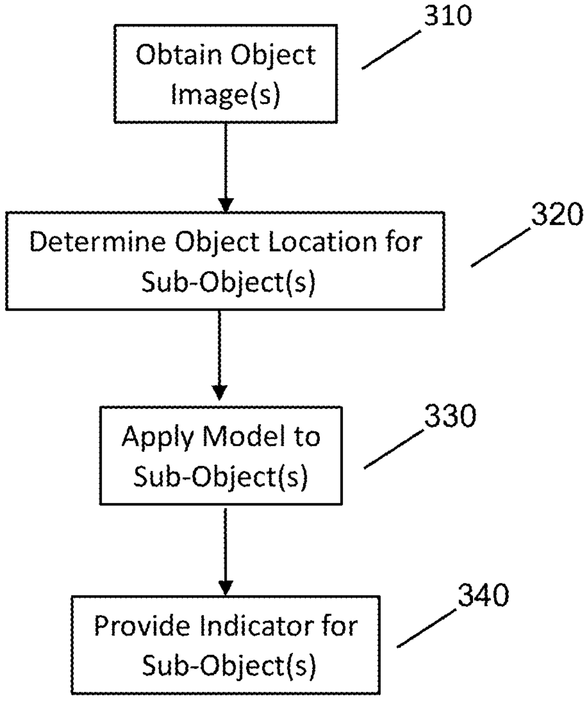

Accordingly, referring to FIG. 3, an embodiment may include a method in which object images are obtained at 310, for example cheese block images, and object locations are determined for sub-objects at 320, such as cheese logs or slices. Application of a model at 330 allows for providing various indicators at 340. For example, in the case of a location tracking model, an embodiment may, after processing has completed for a cheese block, visually indicate a tracked outcome such as a slicing operation for each location with fine granularity, as illustrated in FIG. 5B. In an embodiment that provides a predictive outcome indicator, a predicted outcome for food processing, such as cheese slicing outcome, may be predicted for each sub-object, e.g., a cheese log or cheese slice stack location, based on the location within the cheese block. As described herein, the indicator may include additional or different data, e.g., an instruction to adjust food processing equipment that is manually or automatically implemented. As may be appreciated, a variety of models or computer vision processes may be used in combination. For example, a tracking model's data may be used to update a prediction model's output, such as providing updates to earlier predictions while portions of the block are undergoing processing. This may permit an embodiment to update a prediction for a subsequent cheese log based on initial slicing outcomes.

Figure 6:
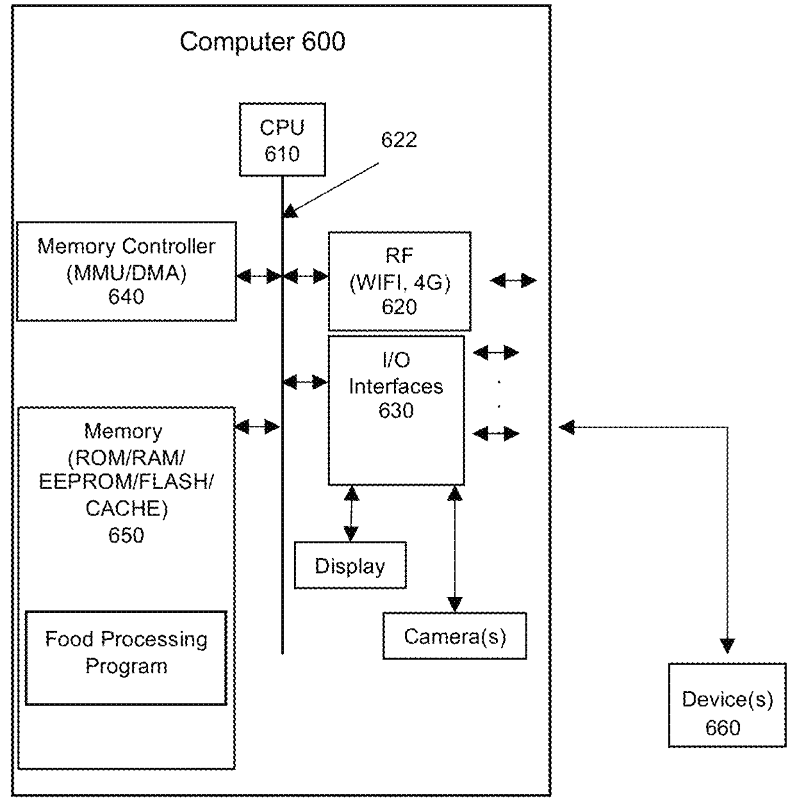
FIG. 6 illustrates an example system according to an embodiment.

It will be readily understood that certain embodiments can be implemented using any of a wide variety of devices or combinations of devices. Referring to FIG. 6, an example device that may be used in implementing one or more embodiments includes a computing device (computer) 600, for example included in or operatively coupled to in an industrial food processing system or component thereof, such as a slicing device, as illustrated at 660.

The computer 600 may execute program instructions or code configured to capture, store, and process data, e.g., images from an imaging device such as one or more cameras positioned about food processing equipment and configured to capture images or videos of objects and sub-objects, as described herein, and perform other functionality of the embodiments. Components of computer 600 may include, but are not limited to, a processing unit 610, which may take a variety of forms such as a central processing unit (CPU), a graphics processing unit (GPU), a combination of the foregoing, etc., a system memory controller 640 and memory 650, and a system bus 622 that couples various system components including the system memory 650 to the processing unit 610. The computer 600 may include or have access to a variety of non-transitory computer readable media. The system memory 650 may include non-transitory computer readable storage media in the form of volatile and/or nonvolatile memory devices such as read only memory (ROM) and/or random-access memory (RAM). By way of example, and not limitation, system memory 650 may also include an operating system, application programs, other program modules, and program data. For example, system memory 650 may include application programs such as image processing software, a food processing program that makes adjustment to food processing equipment based on computer vision outputs, data for one or more models, etc. Data may be transmitted by wired or wireless communication, e.g., to or from computer 600 to another device, e.g., a remote device or system 660.

A user can interface with (for example, enter commands and information) the computer 600 through input devices such as a touch screen, keypad, etc. A monitor or other type of display screen or device can also be connected to the system bus 622 via an interface, such as interface 630. The computer 600 may operate in a networked or distributed environment using logical connections to one or more other remote computers or databases. The logical connections may include a network, such local area network (LAN) or a wide area network (WAN) but may also include other networks/buses.

It should be noted that various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), a solid-state drive, or any suitable combination of the foregoing. In the context of this document "non-transitory" media includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN) or the connection may be made through other devices (for example, through the Internet using an Internet Service Provider), through wireless connections, or through a hard wire connection, such as over a USB or another power and data connection.

Example embodiments are described herein with reference to the figures, which illustrate various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are used in the figures, and a particular illustration of elements has been set forth, these are non-limiting examples. In certain contexts, two or more elements may be combined, an element may be split into two or more elements, or certain elements may be re-ordered, re-organized, combined or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

obtaining one or more images of an object;

thereafter identifying sub-objects, each of the sub-objects representing a respective sub-object physically separated from the object during food processing;

determining, using a set of one or more processors, an object location of respective sub-objects relative to the object; and providing, using the set of one or more processors, an indicator, for the respective sub-objects, associated with the food processing and based on the object location of the respective sub-objects.

2. The method of claim 1, wherein the indicator comprises a tracked or predicted outcome of the food processing for the respective sub-objects.

3. The method of claim 1, comprising obtaining one or more images of the sub-objects after the sub-objects are physically separated from the object;

wherein:

the object exhibits a pattern;

the determining the object location occurs after the respective sub-objects are physically separated from the object; and the object location is determined using the pattern.

4. The method of claim 3, comprising adjusting the food processing based on the indicator.

5. The method of claim 1, wherein the providing the indicator comprises visually identifying one or more of the sub-objects with respect to the object based on respective object locations.

6. The method of claim 5, wherein the visually identifying comprises generating a three-dimensional graphic of the object with one or more of the respective object locations of the sub-objects.

7. The method of claim 6, comprising associating the respective object locations with a tracked or predicted outcome of the food processing.

8. The method of claim 7, wherein the tracked or predicted outcome is associated with an adjustment of food processing equipment.

9. The method of claim 7, wherein the tracked or predicted outcome is a classification associated with a food processing step.

10. The method of claim 9, wherein the classification is formed using a trained model that acts to classify one or more of the images of the object and an image of a respective sub-object.

11. A system, comprising:

one or more cameras;

a set of one or more processors; and a non-transitory storage medium comprising code executable by the set of one or more processors to:

obtain, using the one or more cameras, one or more images of an object having a pattern;

thereafter identify sub-objects, each of the sub-objects representing a respective sub-object physically separated from the object during food processing;

determine an object location of respective sub-objects relative to the object based on the pattern; and provide an indicator, for the respective sub-objects, associated with the food processing and based on the object location of the respective sub-objects.

12. The system of claim 11, wherein the indicator comprises a tracked or predicted outcome of the food processing for the respective sub-objects.

13. The system of claim 11, wherein the code is executable by the set of one or more processors to obtain one or more images, using the one or more cameras, of the sub-objects after the sub-objects are physically separated from the object;

wherein:

the object exhibits a pattern;

the determining the object location occurs after the respective sub-objects are physically separated from the object; and the object location is determined using the pattern.

14. The system of claim 13, comprising one or more components, operatively coupled to the set of one or more processors, including a slicer operating on a respective sub-object;

wherein the code is executable by the set of one or more processors to adjust the one or more components based on the indicator.

15. The system of claim 11, comprising a display device, operatively coupled to the set of one or more processors;

wherein to provide the indicator comprises visually identifying, on the display device, one or more of the sub-objects with respect to the object based on respective object locations.

16. The system of claim 15, wherein the visually identifying comprises generating a three-dimensional graphic of the object with one or more of the respective object locations of the sub-objects.

17. The system of claim 16, wherein the code is executable by the set of one or more processors to associate the respective object locations with a tracked or predicted outcome of the food processing.

18. The system of claim 17, wherein the tracked or predicted outcome is associated with an adjustment of food processing equipment operatively coupled to the one or more processors.

19. The system of claim 7, wherein the tracked or predicted outcome is a classification associated with a food processing step.

20. A computer program product, comprising:

a non-transitory computer readable medium comprising code executable by a set of one or more processors to:

obtain, using one or more cameras, one or more images of an object having a pattern;

thereafter identify sub-objects, each of the sub-objects representing a respective sub-object physically separated from the object during food processing;

determine an object location of respective sub-objects relative to the object based on the pattern; and provide an indicator, for the respective sub-objects, associated with the food processing and based on the object location of the respective sub-objects.

* * * * *